(12) United States Patent  
Michels

(10) Patent No.: US 8,413,919 B2
(45) Date of Patent: Apr. 9, 2013

(54) ROLLER STORAGE SYSTEM FOR SHEET-TYPE OBJECTS

(75) Inventor: Andre Michels, Borgentreich-Grosseneder (DE)

(73) Assignee: Wincor Nixdorf International GmbH (DE)

(*) Notice: Subject to any disclaimer, the term of this patent is extended or adjusted under 35 U.S.C. 154(b) by 0 days.

(21) Appl. No.: 12/598,193

(22) PCT Filed: Apr. 11, 2008

(86) PCT No.: PCT/EP2008/002859
§ 371 (c)(1),
(2), (4) Date: Oct. 29, 2009

(87) PCT Pub. No.: WO2008/138438
PCT Pub. Date: Nov. 20, 2008

(65) Prior Publication Data
US 2010/0133289 A1   Jun. 3, 2010

(30) Foreign Application Priority Data
May 14, 2007  (DE) .......................... 10 2007 022 558

(51) Int. Cl.
*B65H 39/14* (2006.01)
(52) U.S. Cl. ...................................... 242/528; 271/216
(58) Field of Classification Search .................. 242/528; 271/216
See application file for complete search history.

(56) References Cited

U.S. PATENT DOCUMENTS

| | | | | |
|---|---|---|---|---|
| 3,743,200 A * | 7/1973 | Hommerin | ..................... | 242/528 |
| 4,496,142 A | 1/1985 | Iwasaki | | |
| 6,533,207 B2 * | 3/2003 | Eugster et al. | ............. | 242/420.5 |
| 6,715,753 B1 * | 4/2004 | Conca et al. | .................. | 271/216 |
| 2001/0045489 A1 | 11/2001 | Eugster et al. | | |
| 2003/0116400 A1 | 6/2003 | Saltsov et al. | | |
| 2006/0196753 A1 | 9/2006 | Razzaboni et al. | | |

FOREIGN PATENT DOCUMENTS

| | | |
|---|---|---|
| DE | 30 09 008 A1 | 9/1981 |
| DE | 33 14 653 A1 | 11/1983 |
| DE | 198 58 350 A1 | 6/2000 |
| DE | 10 2007 022 558 A1 | 11/2008 |
| EP | 1 155 991 A1 | 11/2001 |
| WO | WO-2004/081883 A2 | 9/2004 |

* cited by examiner

*Primary Examiner* — Sang Kim
(74) *Attorney, Agent, or Firm* — Harness, Dickey & Pierce, P.L.C.

(57) ABSTRACT

A roller storage system is proposed for storing sheet-like items, especially bank notes, comprising at least one film drum (3, 4) that can be driven rotatably by a motor having at least one strip-type film (7, 11), a winding drum (1) that can be driven rotatably by a motor and a hysteresis coupling (21) on the film drum (3, 4) and/or on the winding drum for transmitting torque from a motor to the film drum (3, 4) and/or the winding drum (1). The film (7, 11) is wound from the film drum (3, 4) onto the winding drum (1) for the reception of the sheet-type items (20) and wound from the winding drum (1) onto the two film drums (3, 4) for the delivery of the sheet-type items (20).

24 Claims, 3 Drawing Sheets

ROLLER STORAGE SYSTEM FOR SHEET-TYPE OBJECTS

Figure 1:
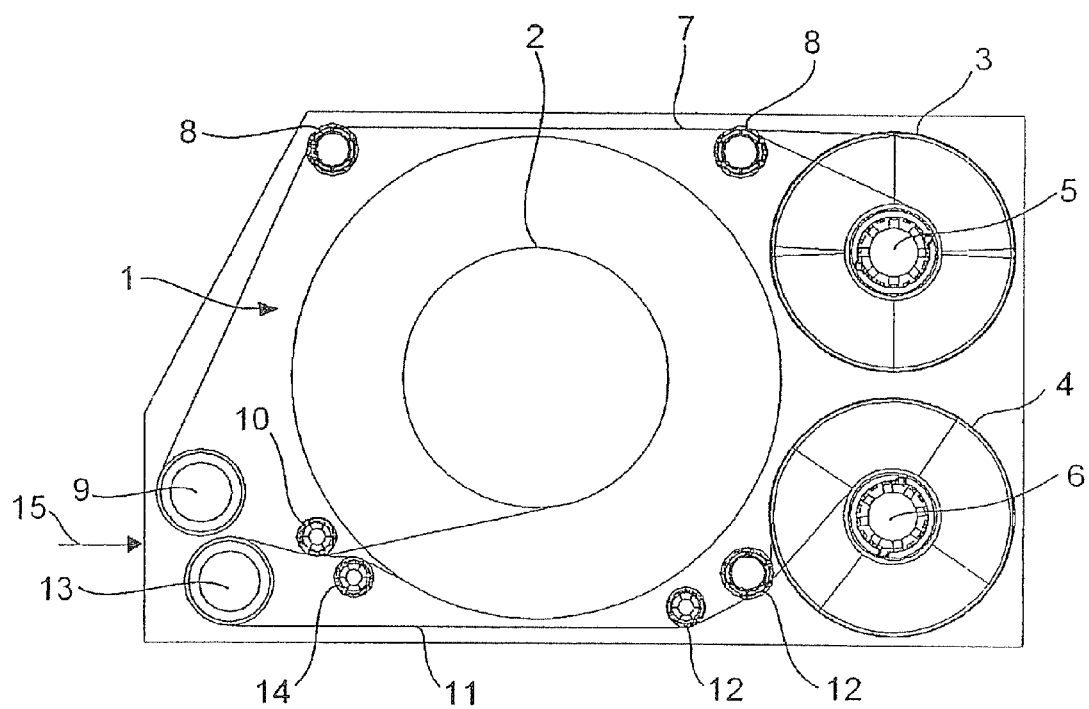

The invention relates to a roller storage system for storing sheet-type items, specifically bank notes, between the winding plies of one or two strip-type films that are spooled back and forth between at least one film drum and one winding drum.

Roller storage systems are used in addition to cassette storage systems in ATMs, POS systems and other money processing systems, for example, automatic teller safes and money recycling systems. Roller storage systems allow bank notes to be stored and delivered easily and quickly. When the roller storage system is filled or stored, the bank notes are wound one after the other onto the winding drum between the winding plies of one or two films. In the first variant of a roller storage system having only one storage strip, the bank notes are held between the winding plies of a strip-type film serving as a storage strip. In a second variant, a second strip-type film is provided in addition to the first film to serve as a cover strip. A first and a second film drum spatially separated from each other are located in the roller storage system for the first and second film. The two films are brought together by their respective jockey roller. The sheet-type items are fed in between the films at the jockey rollers when stored and removed from the films when they are delivered. The sheet-type items are thus held between the first and second film. In the case of the present roller storage system, it may be a roller storage system of the first or second variety.

To deliver the sheet-type items, the film is, or the films are, unwound from the winding drum and wound onto the film drums. As part of this process, the sheet-type items are released from the winding plies and can be removed in succession. Delivery of the sheet-type items is managed on the "last in, first out" principle.

Storage and delivery of the sheet-type items is managed automatically and at high speed. In the process, it is critically important that the sheet-type items are guided and held by the film, or films, in a reliable manner. Consequently, as the film is spooled back and forth between the film drum and the winding drum, it must be ensured that, in spite of the change of direction when transporting the film, the film is transported without forming loops and escaping laterally from its guide. The film must be under tension, which is maintained even when the direction of transportation is reversed and the speed of the film fluctuates.

Roller storage systems are known in which the film is taken over jockey rollers or guide rollers, the spindle of which is spring mounted. This arrangement can compensate specifically for differences in length. However, it is not possible to compensate for fluctuations in speed and the reversal of the direction in which the film is transported. In addition, rollers with spring-mounted spindles complicate the construction and the production of the roller storage system. They are, moreover, susceptible to wear and must be replaced frequently.

The object of the present invention is to provided a roller storage system that is insensitive to wear, in which the film guide is insensitive to contact with the films when a jam is being remedied and for cleaning and service purposes, and in which film tension is maintained even when the direction of film transportation is reversed and during fluctuations in speed.

Compared with the roller storage systems known from the prior art, the roller storage system in accordance with the invention having the features of claim 1 possesses the advantage that either the film drum or the winding drum or both are equipped with a hysteresis coupling to transmit torque from a motor to the film drum and/or to the winding drum. Hysteresis couplings do not transmit torque using mechanical connections; transmission is contactless with the aid of magnetic force. In contrast to the synchronous coupling in which evenly spaced permanent magnets are provided both on the input as well as on the output side, the hysteresis coupling is equipped with only one coupling half having evenly spaced permanent magnets. The second half of the coupling consists of a ring or a disc of a permanently magnetized material with comparatively high remanence and permeability and comparatively low coercive field strength. As a result, the second half of the coupling can be demagnetized by the other half against a resistance. Pole reversal is possible with low expenditure of energy. When the rated torque of the hysteresis coupling is exceeded, which depends on the magnetic force between the first and the second half of the coupling, the coupling begins to slip. The torque transmitted thus remains constant at the level of the rated torque, even when overloaded. The hysteresis coupling is thus completely wear-free and low-maintenance. It is immaterial which of the two halves of the coupling is connected to the input side.

In the first variant of roller storage systems, in which the sheet-type items are held between the winding plies of a film serving as a storage strip, the hysteresis coupling can be located on the film drum or on the winding drum. Preference is given to equipping the film drum with a hysteresis coupling because the film drum is smaller and more manageable than the winding drum and, in addition, there is more space available in the roller storage system on the film drum.

In the second variant of a roller storage system, in which a second strip-type film is provided in addition to the first film to act as a cover strip, and in which the sheet-type items on the winding drum are held between the first and second film, the hysteresis couplings are preferably located on the film drums. This applies equally in the case of a first variant of a roller storage system in which several storage films are wound and unwound adjacent one another and in which a film drum with drive is provided for each storage film. If each of the film drums is equipped with a hysteresis coupling, binding of the first film can be compensated for independently of the second film and any other films. This is not possible with a hysteresis coupling on the winding drum.

The roller storage system equipped with at least one hysteresis coupling possesses the advantage that the hysteresis coupling slips when any binding occurs due to a jam or other causes as soon as the torque caused by the binding is greater than the rated torque of the hysteresis coupling. This prevents any damage to the motor. After the causes of the binding are corrected, operation of the roller storage system can continue without the necessity of resetting or adjusting the hysteresis coupling. Furthermore, differences in speeds, or rotational speeds, of the winding drum and the film drums, which depend on the percentage of film wound onto the respective drum relative to the total length of the film, can be equalized.

It is preferable that one half of the hysteresis coupling be connected mechanically to the shaft of the film drum or the winding drum. The other half of the hysteresis coupling is connected directly or indirectly to the film drum or the winding drum.

In accordance with an advantageous embodiment of the invention, a torsion spring is disposed on the film drum. This spring, which is loaded under torsion, is deflected under the effects of a force against the film, without the force being transmitted immediately to the shaft and thus to the motor as torque. It thus provides a damping effect. This is of particular advantage when there is manual contact with the film or when manually rotating the film drum to correct a jam. Furthermore, differences in speed between the winding drum and the film drums are equalized. This also applies in the second variant of the roller storage system to differences in speed between the first film serving as a storage strip or the second film serving as a cover strip.

In a preferred manner, the hysteresis coupling and the torsion spring on the film drum form a unit. To accomplish this, one half of the hysteresis coupling is immovably connected to the drive shaft of the film drum. The other half of the hysteresis coupling is coupled to one end of the torsion spring. The other end of the torsion spring is connected to the film drum. The unit consisting of hysteresis coupling and torsion spring forms a spring-damper system on the film drum. In addition to this, the potential exists for equipping the winding drum with a hysteresis coupling and the film drum with a torsion spring, or for a combination of hysteresis coupling and torsion spring to be disposed on the winding drum. The torsion spring can, for example, be a helical torsion spring.

In accordance with a further advantageous embodiment of the invention, the film drum is equipped with a ball bearing. In this case, one half of the hysteresis coupling is immovably connected to the drive shaft of the film drum. The drive shaft extends in the axial direction through the film drum. Since the torque of the drive shaft is transmitted over the hysteresis coupling to the film drum, the movement of the film drum relative to the drive shaft running through said drum must take place with as little friction as possible. This is ensured in the case of a ball bearing. A drive shaft extending through the film drum offers the advantage that a second film drum can be disposed on the drive shaft adjacent the first film drum in the axial direction and driven rotatably by said shaft. An arrangement of this type is advantageous with roller storage systems in which bank notes are wound up in an alignment perpendicular to the direction of film transportation. Both film drums can in this instance be driven rotatably by one motor and one drive shaft. In this instance, a hysteresis coupling and a torsion spring are disposed on each film drum since binding can occur with only one of the two films.

In accordance with a further advantageous embodiment of the invention, the roller storage system is equipped with at least one jockey roller for the film. The diameter of the jockey roller is smaller at its two ends than in an area between the two ends. The jockey roller is located in the feed or discharge of the roller storage system, where the sheet-type items are fed to the winding drum or removed from said drum respectively. In order to specify the direction of the sheet-type items when received into the roller storage system and when delivered from the roller storage system as precisely as possible and match it to the direction determined by the feed and the delivery, the jockey roller is, or the jockey rollers are, of as large a diameter as possible. They consequently exercise a considerable effect on the film guide. This effect is amplified by the relatively large spacing between the jockey roller and additional rollers serving to guide the film. The shape of the jockey roller with a smaller diameter at its two ends and a larger diameter in an area between the ends has a positive effect on how the film is guided. The film is centered relative to the jockey roller by the forces exerted on the film by the jockey roller. The film is prevented automatically from slipping to one side or the other as well as jumping laterally out of the guide. The additional advantage of the jockey roller with the curved shape is that less force is applied at the edges of the film by the jockey roller than with jockey rollers having a cylindrical shape. The risk of the film tearing at the edges is thereby reduced. The shape of the jockey rollers contributes substantially to the low-wear properties of the roller storage system. The preferred difference between the smallest and the largest diameter is between 0.1% and 20% of the largest diameter of the jockey roller. The particularly preferred difference is between 0.5% and 10%.

In accordance with a further advantageous embodiment of the invention, the roller storage system is equipped with at least one support roller and/or at least one guide roller for the film. The diameter of the support roller and/or the guide roller is smaller at the two ends than in an area between the two ends. The same effect is achieved thereby as with the jockey roller previously described. The diameters of the support rollers and guide rollers are usually smaller than the diameters of the jockey rollers since they are serve exclusively to guide the films and not to receive or deliver sheet-type items. The difference between the largest and the smallest diameter of the support roller can be in the same range as the difference between the diameters of the jockey roller.

In accordance with a further advantageous embodiment of the invention, the jockey roller and/or the support roller and/or the guide roller have an outwards curved surface. With respect to their lateral surface, the rollers are preferably mirror-symmetrical to a plane that extends perpendicular to their axis of rotation through the center of the roller. The surface of the rollers is, therefore, free of edges and joints. The roller transmits a force to the film over a broad area as the result of the curved, round shape of its surface that contributes to guiding the film. Because of a certain elasticity in the film, it lies against the jockey roller, the support roller or the guide roller.

In accordance with a further advantageous embodiment of the invention, the jockey roller and/or the support roller and/or the guide roller are composed of two cones or frusta of a cone. This permits a particularly simple and cost-effective structure for the rollers in question. This structure is preferred in particular for the support rollers and the guide rollers. The cones or frusta of a cone are joined along a common axis such that their larger end faces face each other. The cones or frusta of a cone may be hollow internally or solid.

In accordance with a further advantageous embodiment of the invention, the jockey rollers ride in ball bearings. The ball bearings have the advantage of lower friction and thus reduced wear.

In accordance with a further advantageous embodiment of the invention, the guide rollers and support rollers ride in plain bearings, thus allowing the rollers to be produced cost-effectively. Replacement is quick and easy in the event of wear.

In accordance with a further advantageous embodiment of the invention, the jockey roller consists, at least on the lateral surface of the outer cover, of a resilient, rubber-like material. The result is to achieve increased friction between the jockey roller and the film, which has a positive effect on guiding the film. Because the material is resilient and rubber-like, no wear is generated on the film as the film is guided. Consequently, wear on the film is minimized. Nevertheless, the material should possess a specific hardness in spite of the increased coefficients of friction so that the jockey pulley cannot deform, or at least deform only minimally, when the film exerts a force on it.

Further advantages and advantageous embodiments of the invention can be found in the following description, the drawing and the claims.

An embodiment of the invention is shown in the drawing.

Figure 2:
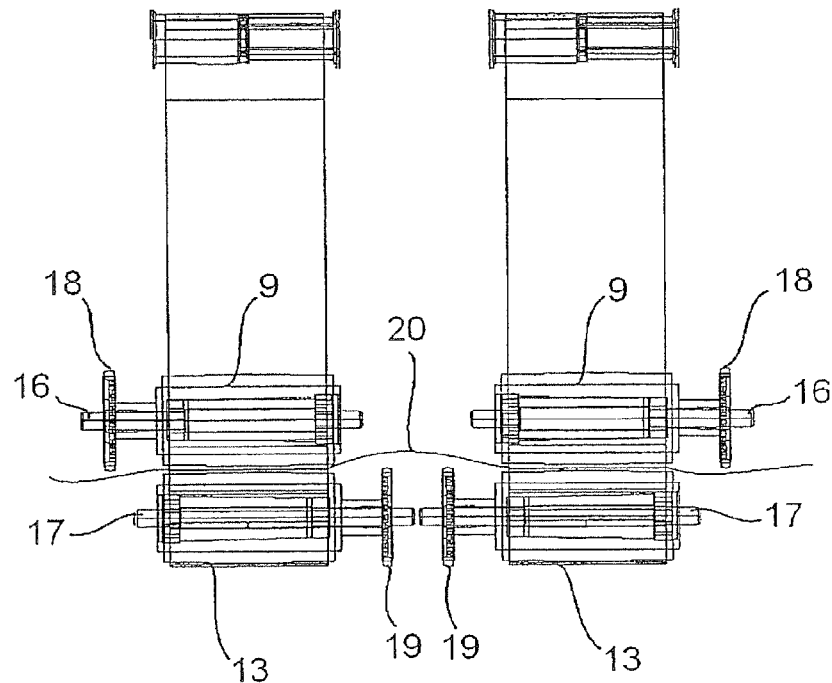
Figure 3:
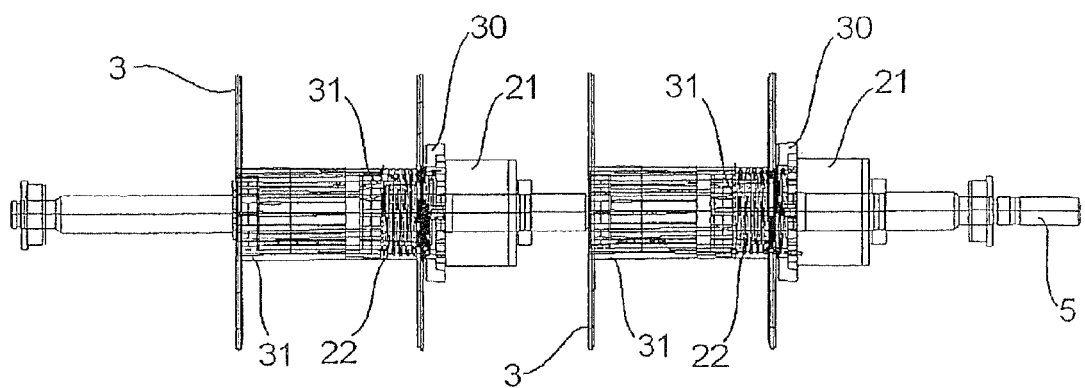
Figure 4:
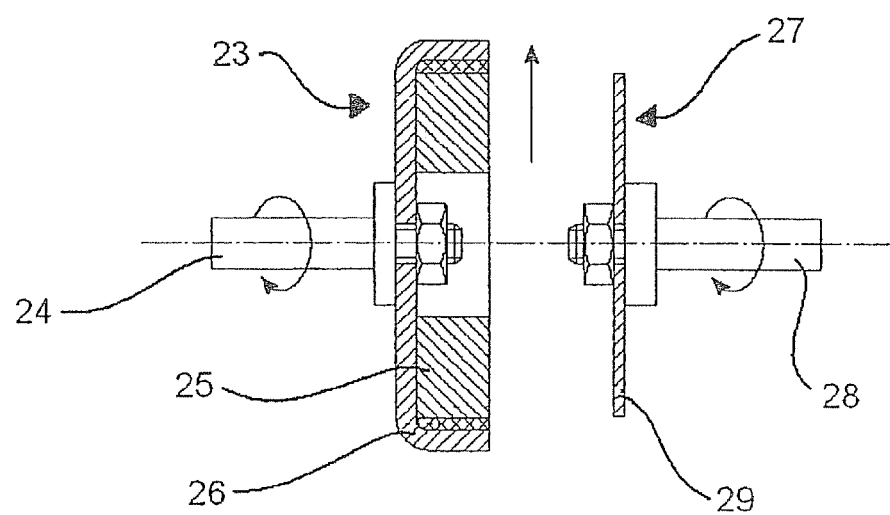

FIG. 1 shows a schematic representation of a roller storage system in a side elevation, FIG. 2 shows a view of the jockey rollers and the support rollers of the roller storage system from FIG. 1 in a front elevation, FIG. 3 shows the drive shaft with two first film drums of the roller storage system from FIG. 1, FIG. 4 shows a hysteresis coupling for the two film drums from FIG. 3.

FIG. 1 is a simplified representation of a roller storage system in a side elevation with the housing open. A winding drum 1 with a winding core 2 is located in the center. The outer circle around the winding core 2 indicates the circumference of the winding drum 1 in its filled state. Two first film drums 3 and two second film drums 4 are shown to the right of the winding drum 1. The two first film drums 3 are disposed adjacent each other in the axial direction on the drive shaft 5. This is shown in FIG. 3. The two second film drums 4 are disposed correspondingly adjacent each other in the axial direction on the drive shaft 6. Since the viewing direction in FIG. 1 is identical to the alignment of the drive shafts 5 and 6, only the particular film drum facing the viewer can be seen in FIG. 1. The two drive shafts 5 and 6 are connected to one or two motors not shown on the drawing. A first film 7 is wound on each of the two first film drums 3 guided over two guide rollers 8, a first jockey roller 9 and a support roller 10 to the winding drum 1. The two first films 7, the guide rollers 8, the two jockey rollers 9 and the two support rollers 10 are disposed adjacent each other, in an identical manner to the two first film drums 3, so that in FIG. 1 only one of the rollers and films mentioned is visible to the observer. A second film 11 is wound on each of the two second film drums 4 which is taken to the winding drum 1 over two guide rollers 12, a second jockey roller 13 and a second support roller 14. The spindles of the winding drum 1, the first film drums 3, the second film drums 4, the guide rollers 8 and 12, the jockey rollers 9 and 13 and the support rollers 10 and 14 run parallel. In the case of the two jockey rollers 9 and 13, the first films 7 and the second films 11 are brought together such that a first film lies on top of a second film in the section between the two jockey rollers 9 and 13 and the winding drum 1. This applies also to the two film pairs consisting of a first and a second film 7 and 11 running in parallel next to each other. For purposes of simplification, the transport of only one film pair consisting of a first and second film 7 and 11 is described in the following. The transport of the other film pair proceeds in exactly the same manner. The feed of sheet-type items not shown in FIG. 1 proceeds in a horizontal direction in accordance with the arrow marked with the numeral 15 in FIG. 1. An apparatus serving to guide the paper to the feed is not shown in the Figure. The sheet-type items arriving at the two jockey rollers 9 and 13 are acquired initially by the first film 7, guided over the first jockey roller 9 and then taken to the second film 11 taken around the second jockey roller 13. This time-delayed contact with the first and second jockey roller 9 and 13 results from an offset between the two jockey rollers. After the second jockey roller 13, the first and second films 7 and 11 are pressed together, and the sheet-type items disposed therebetween are held. Because of the force that the two jockey rollers 9 and 13, as well as the two support rollers 10 and 14 apply to the first and second film and thus to the sheet-type items between the films, and because of the friction existing between the sheet-type items and the films, the position of the sheet-type items relative to the films is maintained from the two jockey rollers 9 and 13 as far as the winding drum 1. As soon as the items are on the winding drum, their position does not change further, given sufficient tension in the films. Between the two jockey rollers 9 and 13 and the winding drum 1, the two films 7 and 11 and the sheet-type items disposed between them undergo several changes of direction on account of the two support rollers 10 and 14. Additional forces are applied to the two films and the sheet-type items between them as a result of these changes of direction. The distance between the two jockey rollers 9 and 13, the first support roller 10, the second support roller 14 and the winding drum 1 is selected such that even the smallest sheet-type item is always in contact with at least one jockey roller or at least one support roller between the first jockey roller 9 and the winding drum 1. The films are not only taken tangentially past the two jockey rollers 9 and 13 and the two support rollers 10 and 14 but diverted in another direction, whereby the contact between film and jockey roller and between film and support roller takes place over a greater section of film and the force applied is increased.

Delivery takes place as the two films 7 and 11 are wound onto the film drums 3 and 4 over the two support rollers 10 and 14, the two jockey rollers 9 and 13 and the guide rollers 8 and 12. The sheet-type items are delivered between the two jockey rollers 9 and 13 in the horizontal direction opposite to arrow 15.

FIG. 2 shows the two first jockey rollers 9 and the two second jockey rollers 13 in a front elevation. The direction of viewing corresponds to the feed marked with an arrow 15 in FIG. 1. Each of the jockey rollers 9 and 13 is carried so that it can rotate about a spindle 16 and 17. A disc 18 is carried on the spindle 16 so that it can rotate, axially spaced from the two first jockey rollers 9 on the side facing away from the other first jockey roller in each case. A spacer not shown in the drawing ensures that the distance between the first jockey rollers 9 and the discs 18 remains constant. Corresponding discs are positioned on the spindles 17 of the second jockey rollers 13. In contrast to the discs 18, the discs 19 are positioned between the two second jockey rollers. The diameter of the two discs 18 and 19 is greater than the diameter of the first and second jockey rollers 9 and 13. The result is that a sheet-type item 20 undergoes a winding or wave-shaped deformation from the discs 18 and 19 as it is transported between the first and second jockey rollers 9 and 13. This deflection of the sheet-type item 20 is shown in FIG. 2. The sheet-type item is bent upward by the discs in the middle between the jockey rollers 9 and 13 and downwards at the sides.

The first films 7 and the two support rollers 10 are shown in FIG. 2 in addition to the jockey rollers 9 and 13, although the former are concealed by the two jockey rollers 9 and 13 when viewed in the same direction as the direction of the feed. However, it becomes clear from this representation, which does not correspond to reality, that the two films 7 run parallel adjacent one another and that a sheet-type item 20 is transported by two films 7 and the films 11 lying thereunder.

The two first film drums 3 and the common drive shaft 5 are shown in FIG. 3. The torque from the drive shaft 5 is transmitted over a hysteresis coupling 21 and a torsion spring 22 to the film drum. The hysteresis coupling 21 is shown in FIG. 3 with a coupling housing. FIG. 4 shows the hysteresis coupling without a housing. The first half 23 of the hysteresis coupling 21 consists of a first stub axle 24 and one or several magnets 25 that are disposed in a magnet holder 26 of soft iron. The second half of the coupling 27 consists of a second stub axle 28 and a disc 29 of a hysteresis material with great remanence and permeability and low coercive field strength. As a result of the magnetic force acting between the magnets 25 and the disc 29, the torque from the first stub axle 24 is transmitted to the second stub axle 28. It is immaterial which of the two stub axles 28 and 29 is connected to the drive shaft 5.

The first half 23 of the hysteresis coupling 21 is mechanically connected to the drive shaft 5. The second half 27 of the hysteresis coupling 21 is coupled through a spool adapter 30 to one end of the torsion spring 22. The other end of the torsion spring 22 is attached to the film drum 3. The film drum 3 is additionally connected through a grooved ball bearing 31 to the drive shaft 5. When the two halves of the coupling 23 and 27 are coupled to together, the torque from the drive shaft 5 is transmitted over the hysteresis coupling 21 to the film drum 3. When the two halves of the coupling 23 and 27 are decoupled as desired, or if the hysteresis coupling 21 slips, the film drum can rotate freely relative to the drive shaft 5 because of the grooved ball bearing 31.

The two film drums 4 are similarly equipped with a combination of a hysteresis coupling and a torsion spring and a grooved ball bearing in identical fashion to the two film drums 3. The construction is the same as that in FIG. 3. The hysteresis coupling, the torsion spring and the grooved ball bearing are identical to the hysteresis coupling 21, the torsion spring 22 and the grooved ball bearing 31.

When sheet-type items 20 are fed into the roller storage system and wound onto the winding drum 1, the winding drum 1 is driven by a motor. The film drums 3 and 4 are decoupled from their drive in this case and rotate freely relative to the drive shafts 5 and 6 on account of the grooved ball bearing. On the other hand, when the films 7 and 11 are unwound from the winding drum and wound onto the film drums 3 and 4 when the sheet-like items are delivered, the film drums 3 and 4 are driven and the winding drum rotates freely relative to its driveshaft or at a rotational speed that is less than the rotational speed of the film drums. In this case, the film drums 3 and 4 are connected to the drive shafts 5 and 6 through the hysteresis couplings 21. The hysteresis couplings do not slip until a jam or an obstacle arises that resists film transportation with a torque that is greater than the rated torque of the hysteresis couplings.

All the features may be essential to the invention both individually as well as in any combination with each other.

LIST OF REFERENCE NUMERALS

1 Winding drum
2 Winding core of the winding drum
3 First film drum
4 Second film drum
5 Drive shaft for first film drum
6 Drive shaft for second film drum
7 First film
8 Guide roller
9 First jockey roller
10 First support roller
11 Second film
12 Guide roller
13 Second jockey roller
14 Second support roller
15 Direction of feed
16 Spindle of first jockey rollers
17 Spindle of second jockey rollers
18 Disc
19 Disc
20 Sheet-type item
21 Hysteresis coupling
22 Torsion spring
23 First half of hysteresis coupling
24 First stub axle
25 Magnet
26 Magnet holder
27 Second half of coupling
28 Second stub axle
29 Disc
30 Spool adapter
31 Grooved ball bearing

What is claimed is:

1. A roller storage system for storing sheet-like items comprising:
at least one film drum having at least one strip-type film that can be rotatably driven;
a winding drum that can be rotatably driven, the film can be wound onto the winding drum to receive the sheet-types items from the film drum and can be wound from the winding drum onto the film drum to deliver the sheet-type items;
a hysteresis coupling on at least one of the film drum or the winding drum to transmit torque thereto; and
a torsion spring on at least one of the film drum or the winding drum;
wherein the hysteresis coupling includes a first half and a second half, the first half includes a magnet coupled to the drive shaft with a stub axle, the second half includes a disc coupled to the magnet in the coupled position and spaced apart from the magnet in the decoupled position, the disc is coupled to a spool adaptor, the spool adaptor is coupled to the torsion spring, the torsion spring is coupled to one of the film drum or the winding drum.

2. The roller storage system of claim 1, wherein the torsion spring is disposed between the hysteresis coupling and the film drum.

3. The roller storage system of claim 2, wherein the film drum is equipped with a ball bearing.

4. The roller storage system of claim 1, wherein the film drum is equipped with a ball bearing.

5. The roller storage system of claim 4, wherein the ball bearing is a grooved ball bearing.

6. The roller storage system of claim 1, wherein the roller storage system is equipped with at least one jockey roller for the film and wherein the jockey roller has a smaller diameter at its two ends than at an area between the two ends.

7. The roller storage system of claim 6, wherein the roller storage system is equipped with at least one support roller for the film and wherein the support roller has a smaller diameter at both ends than at an area between the two ends.

8. The roller storage system of claim 7, wherein the roller storage system is equipped with at least one guide roller for the film, and wherein the guide roller has a smaller diameter at both ends than at an area between the two ends.

9. The roller storage system of claim 8, wherein at least one of the jockey roller the support roller, or the guide roller have an outward curved surface.

10. The roller storage system of claim 8, wherein at least one of the jockey roller, the support roller, or the guide roller are composed of two cones or frustra of a cone.

11. The roller storage system of claim 8, wherein at least one of the jockey roller, the support roller, or the guide roller include an outward curved surface.

12. The roller storage system of claim 8, wherein at least one of the jockey roller, the support roller, or the guide roller are composed of two cones or frustra of a cone.

13. The roller storage system of claim 6, wherein the jockey roller includes a resilient, rubber-like material.

14. The roller storage system of claim 1, wherein, in addition to a first film drum with a first strip-type film as storage strip, a second film drum driven with a second strip-type film as cover strip is located to hold the sheet-type items between the first and second film, wherein the films can be wound onto the winding drum to receive the sheet-type items from the two film drums and can be wound from the winding drum onto the two film drums to deliver the sheet-type items, and both film drums are equipped with the hysteresis coupling.

15. The roller storage system of claim 14, wherein both film drums are equipped with a torsion spring.

16. The roller storage system of claim 1, wherein the film drum is equipped with a ball bearing.

17. A roller storage system for storing sheet-like items comprising:
   a winding drum;
   a film drum;
   a film extending between the winding drum and the film drum, the film configured to be wound onto the winding drum to store the items on the winding drum, and be wound off of the winding drum to dispense the items;
   a torsion spring on one of the film drum or the winding drum;
   a drive shaft;
   a ball bearing coupling one of the winding drum or the film drum to the drive shaft; and
   a hysteresis coupling connected to the drive shaft and one of the winding drum or the film drum, the hysteresis coupling configured to transfer torque from the drive shaft to one of the film drum or the winding drum when in a coupled position, and configured to restrict transfer of torque in a decoupled position;
   wherein the hysteresis coupling includes a first half and a second half, the first half includes a magnet coupled to the drive shaft with a stub axle, the second half includes a disc coupled to the magnet in the coupled position and spaced apart from the magnet in the decoupled position, the disc is coupled to a spool adaptor, the spool adaptor is coupled to the torsion spring, the torsion spring is coupled to one of the film drum or the winding drum.

18. The roller storage system of claim 17, wherein the torsion spring includes a first end and a second end, the first end is coupled to one of the film drum or the winding drum, and the second end is coupled to a spool adaptor, which is connected to the hysteresis coupling.

19. The roller storage system of claim 17, wherein the film drum is a first film drum and the hysteresis coupling is a first hysteresis coupling, the roller storage system further comprising a second film drum that is substantially similar to the first film drum and a second hysteresis coupling that is substantially similar to the first hysteresis coupling, the first hysteresis coupling is connected to the first film drum and the second hysteresis coupling is connected to the second film drum.

20. The roller storage system of claim 19, further comprising a third hysteresis coupling on the winding drum.

21. The roller storage system of claim 17, wherein the ball bearing is a grooved ball bearing.

22. A roller storage system for storing bank notes comprising:
   a winding drum;
   a first film drum;
   a second film drum;
   a first film that extends between the first film drum and the winding drum and a second film that extends between the second film drum and the winding drum, the first and the second films are configured to be wound onto the winding drum to store bank notes therebetween, and configured to be wound off of the winding drum to dispense bank notes;
   a first hysteresis coupling configured to selectively couple a first drive shaft to the first film drum to transfer torque from the first drive shaft to the first film drum;
   a first half of the first hysteresis coupling includes a magnet seated in a magnet holder, the magnet holder is coupled to the drive shaft with a first stub axle;
   a second half of the first hysteresis coupling includes a disc mounted to a second stub axle, the disc is configured to selectively couple with the magnet to connect the first and the second halves of the hysteresis coupling together;
   a first spool adaptor connected to the second half of the first hysteresis coupling;
   a first torsion spring, a first end of the first torsion spring is coupled to the first spool adaptor, and a second end of the first torsion spring is coupled to the first film drum; and
   a first grooved ball bearing connecting the first film drum to the first drive shaft both when the first and the second halves of the hysteresis coupling are coupled and decoupled.

23. The roller storage system of claim 22, further comprising:
   a second hysteresis coupling configured to selectively couple a second drive shaft to the second film drum to transfer torque from the second drive shaft to the second film drum, the second hysteresis coupling is substantially similar to the first hysteresis coupling; and
   a second spool adaptor, a second torsion spring, and a second grooved ball bearing each associated with the second drive shaft and the second film drum, and each substantially similar to the first spool adaptor, the first torsion spring, and the first grooved ball bearing respectively.

24. The roller storage system of claim 23, further comprising a third hysteresis coupling on the winding drum, the third hysteresis coupling is substantially similar to both the first hysteresis coupling and the second hysteresis coupling.

* * * * *